April 28, 1931.　　　M. GRIFFOUL　　　1,802,505

CHANGE SPEED DEVICE

Filed Nov. 21, 1927

INVENTOR
MARCEL GRIFFOUL
By
George L. Sachs
ATTORNEY

Patented Apr. 28, 1931

1,802,505

UNITED STATES PATENT OFFICE

MARCEL GRIFFOUL, OF PARIS, FRANCE

CHANGE-SPEED DEVICE

Application filed November 21, 1927, Serial No. 234,808, and in France November 22, 1926.

My invention relates to a change-speed device for increasing or decreasing the speed, of a purely mechanical nature, without spur or worm gearing, or friction rollers, and without play, providing for a considerable speed reduction ratio which is variable at will, and chiefly applicable to the control of accurate regulating devices in which no great power is required for their motion, for instance as comprised in certain apparatus pertaining to physics such as radio condensers.

My said device according to the invention essentially comprises a circular member having an inclined position which is caused by a pushing element, actuated by the driving shaft, to roll upon a stationary flat surface, thus applying the successive points of its circumference upon the successive points of a circumference situated upon the said flat surface, said circular member having its central shaft connected in rotation with the actuated shaft.

Due to the difference between the developed lengths of the periphery of said circular member and of the stationary circumference which it follows, the shaft which is driven by the shaft of the circular member will when rotating assume a difference of speed with reference to the speed of the said pushing element (advanced or retarded) whereby the rotation of the driving shaft will be transmitted to the actuated shaft with an increase or a decrease of speed whose ratio depends upon the inclination of the plane of said circular member with reference to the stationary flat surface, which inclination can also be varied if it is desired to change the ratio of transmission.

The appended drawings comprise by way of example various diagrams by which the principle of the said invention is explained, and also a certain number of embodiments of the invention.

Figure 1:
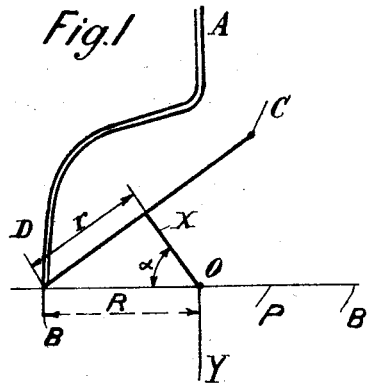
Figure 3:
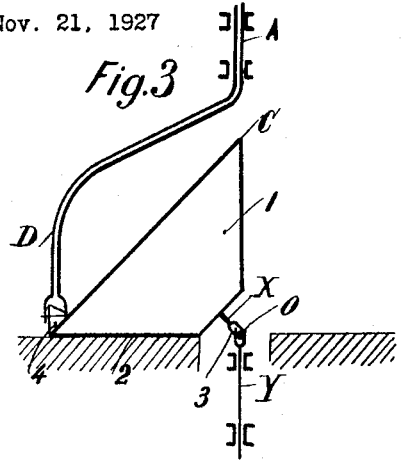
Figure 2:
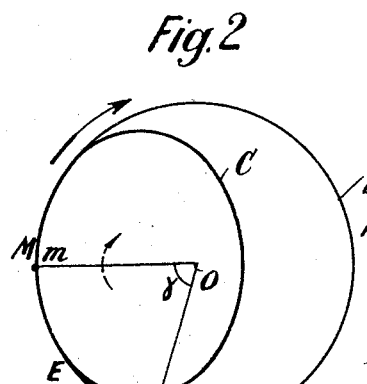
Figure 4:
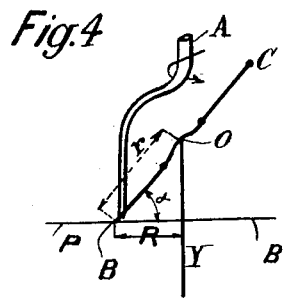
Figures 5, 6:
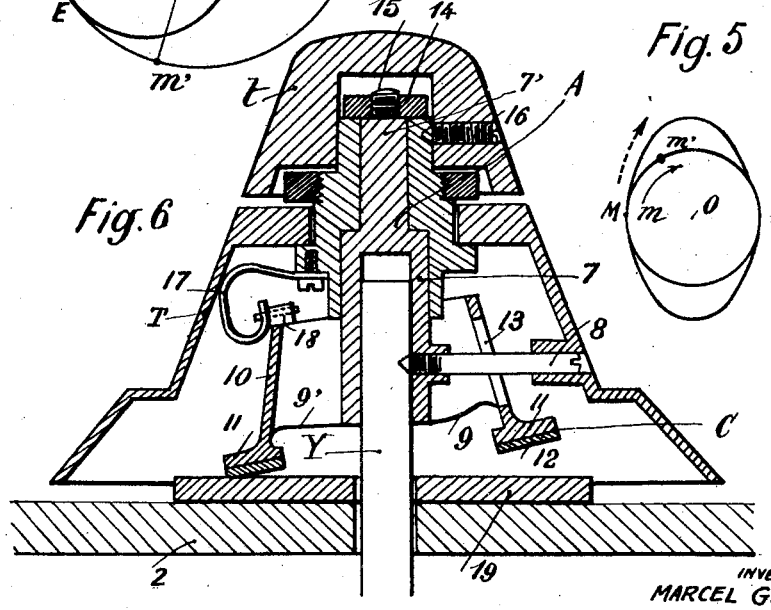

Figs. 1 and 2 are geometric figures illustrating one embodiment and Fig. 3 is a diagrammatic view of a construction which may be herein employed. Figs. 4 and 5 are geometric figures illustrating a second embodiment. Fig. 6 is an axial section of a corresponding form of construction.

I.—I will first consider the case of a circle rolling upon another circle of larger periphery.

Figs. 1 and 2 are geometric figures which are shown respectively in elevation and in plan. P represents a stationary flat surface upon whose circumference B is caused to roll the periphery of the circle C whose axis O X is inclined by the angle $\alpha$ from the surface P and is obliged to pass constantly through the centre O of the circumference B. For instance an arm D which is rotated by the actuating shaft A in the direction of the full-line arrow (Fig. 2); pushes the successive points of the circle C upon the successive points of the circumference B. Let it be further supposed that the axis O X of the circle is rotatively connected—by Cardan or flexible blades or the like—with an extension shaft O Y which is guided coaxially with the actuating shaft A. Let $r$ be the radius of the circle C and R the radius of the base B.

It will be noted that the rotation of O Y is due to the combination of two rotations, firstly the rotation of O X upon itself for the rolling motion, in the direction of the dotted arrow in Fig. 2 i. e. in the opposite direction from the motion of the actuating shaft A; and secondly the rotation due to the movement of mutation of the plane of the circle about the vertical axis, which latter rotation has the same direction as the shaft A. Since the developed length of C is less than that of B, a given point $m$ of the circle C which was originally in contact with the point M of the base B, will come into contact with said base at $m'$ (supposing for the sake of demonstration that O X makes a complete revolution on itself for this purpose) in such manner that:

$$\text{arc } MHm' = 2\pi r.$$

The shaft O Y will thus have rotated according to the following movement:

1.—A complete revolution $2\pi$ in the direction of the dotted arrow, accompanying the revolution of O X upon itself.

2.—An angle $2\pi - \gamma$ corresponding to the arc M H $m'$, in the direction of the full-line arrow, accompanying the movement of mutation of the axis O X of the circle about the vertical axis.

As the total effect, the shaft O Y will thus have rotated in the opposite direction from the actuating shaft, through the angle $\gamma$.

During this time, the actuating shaft A will have rotated through the arc M H $m'$, or the angle $2\pi - \gamma$.

If the speed of O Y is $V'$ and the speed of A is $V$, the ratio of transmission will thus be $$\frac{V'}{V} = \frac{\gamma}{2\pi - \gamma}$$

But $$\gamma R = 2\pi R - \text{arc } MHm' = 2\pi(R-r)$$

Whence $$\frac{V'}{V} = \frac{R-r}{r}$$

If $r = R$, $V' = 0$ and the resulting speed will be infinitely small.

If $r = 0$, $V' = \infty$ and hence the resulting speed will be infinitely large.

If $r = \frac{R}{2}$, the ratio $\frac{V'}{V} = 1$.

Otherwise stated, if the angle $\alpha$ (Fig. 1) is greater than 30 degrees, the speed will be reduced, and if below 30 degrees the speed will be increased.

This arrangement may assume a material form, as shown diagrammatically in Fig. 3, by the use of a truncated cone 1 rolling upon a circular base 2; the shaft X forming the axis of the said truncated cone is connected with the actuated shaft by a system of Cardan or flexible blades or the like 3, so that the intersection of the two axes will be situated at O on the axis and for instance at the centre of the base circumference B. A supporting roller 4 mounted on an arm D in line with the actuating shaft A causes the cone to roll upon the circular base.

The said mechanism will actuate the driven shaft Y solely due to the fact that the friction of the cone upon the base will prevent it from slipping. The said mechanism has no play, i. e., there will be no useless time when the direction of the control is reversed. The ratio of transmission can be varied by changing the angle $\alpha$ of the inclination of the axis of the circle relatively to the base plane.

I may prevent the reversal of the direction of motion of the actuated shaft with reference to the actuating shaft, and for this purpose the device is constructed on the following principle.

II.—This case relates to a circle having a larger circumference which rolls upon a stationary circular base which is smaller.

B represents (as before) the circumference of the base and C the circle rolling thereon by means of the elastic pressure of a rotating arm D.

The axis passing through the centre of the circle and perpendicular to its plane cannot in this case, as in the preceding, pass through the centre O of the circular base. The axis O Y might be extended upwardly through a cut out at the middle circle as far as the intersection with the also extended axis O X of the circle, and the pivot joint placed at this intersection. A simpler device is afforded if the axis O X of the circle is not given a material form, the said circle, represented by a ring, being connected with the actuated shaft O Y by a set of deformable blades.

If the geometric axis of the circle makes a complete revolution upon itself, since the periphery of the circle exceeds that of the base, the point $m$ which originally coincided with M will again make contact with the base at a point $m'$ which in this case will be situated forwardly of M according to the direction of rotation of the driving shaft. The preceding considerations are still valid, and the transmission ratio is now $$\frac{V'}{V} = \frac{r-R}{r}$$

i. e. the device shows the same features as before, except that the actuated shaft now rotates in the same direction as the driving shaft.

Fig. 6 shows an embodiment of the invention according to this latter case, the device being chiefly adapted for the control of condensers employed in radio apparatus.

The actuated shaft Y is guided in bearings (not shown) and it serves in turn to guide the driving shaft A by means of a sleeve 7 carrying the ring C whose position may be adjusted along the shaft Y.

The said sleeve 7 is secured to the shaft Y by the screw 8 which also secures the drum T—used for direct drive at high speed—to the shaft Y; said sleeve 7 carries by means of a deformable spider consisting of flexible blades 9 and 9', a ringlike member 10 whose lower edge 11 is faced with a flat ring 12 of rubber or the like whereby all slipping with reference to the base 2 will be obviated; said member 10 forms the preceding element C; the member 10 is pierced with an aperture 13 for the free insertion of the screw 8.

The hollow shaft A is rotatable by means of a journal 7' in line with the sleeve 7; said shaft is held in place by a nut 14 mounted on the threaded end 15 of the journal 7'. Upon the shaft is mounted the drum $t$ for the control of the slow motion, by means of the screw 16. The shaft A extends through the end of the drum T in such manner that the said drum will be pivoted thereon; in the interior of the drum T the shaft A is provided with a spring 17 which presses, in an elastic manner, the roller 18 against the upper edge of the member 10. In this manner, the drum T may be acted upon to directly drive the shaft Y; the ring C will then slide with friction upon the base 2. If on the contrary the drum t is acted upon, the roller 18 is rotated on the axis of the device; the ring C will roll upon the circular base, and the shaft Y will rotate at a much reduced speed in the same direction as the drum t, as in the preceding case.

If the ratio of transmission is to be changed, I place between the base 2 and the ring C one or more disks 19 having a certain thickness; this reduces the inclination of the ring C with reference to the base, thereby increasing the angle $\alpha$ and reducing the ratio $$\frac{V^1}{V}.$$

In this manner a very great speed reduction may be obtained. Should the said disks be removed, the speed reduction will be less.

I may further provide means whereby the angle $\alpha$ may be varied while the device is in motion, and this can be effected by sliding axially either the said ring of the flat base or the said interposed disk, one with reference to the other, by means of a controlling fork or the like.

Should the actuated shaft make contact with an abutment, the device will suffer no damage, and the ring C will only slide with friction upon the flat base.

Obviously, the forms of construction are susceptible of numerous variations without departing from the spirit of the invention.

Claims:

1. A change-speed device comprising a flat base element transversally disposed upon the actuated shaft, an annular and stiff member which is inclined from the said flat base element with continuous periphery and is adapted to roll thereon without sliding, means connecting the said annular member with the actuated shaft whereby the movement of rotation of said member will be transmitted to said actuated shaft about its geometric axis, and a pushing and freely rotating element connected with the driving shaft and moving with reference to the periphery of the said annular member whereby the successive contact points of the rolling periphery of said member will be caused to bear upon the said flat base element without adhesion with said pushing element.

2. A change-speed device comprising a flat base element perpendicular to the actuated shaft, an annular and stiff member with continuous periphery which is inclined from said flat base and is adapted to roll without sliding thereon, means connecting the said annular member with the actuated shaft in rotation about the geometric axis of the latter, and a pushing and freely rotating element disposed upon the driving shaft and moving with reference to the periphery of said annular member to cause the successive points of the rolling periphery of said annular member to bear upon the flat base element.

3. A change-speed device comprising a flat base element perpendicular to the actuated shaft, a stiff ring with continuous periphery which is connected with said actuated shaft by deformable elastic blades whereby the said ring may be inclined from the axis of said shaft successively in different directions about the said shaft, a rolling band disposed upon said ring and making elastic contact with the base element at a variable point of its periphery, a driving shaft perpendicular to said base element, and an arm disposed upon said shaft to push the corresponding part of said ring against the base element.

4. A change-speed device comprising a flat base element disposed transversely upon the actuated shaft, an annular and stiff member with continuous periphery which is inclined from the said flat base element and is adapted to roll without sliding thereon, means connecting the said annular member with the actuated shaft whereby the movement of rotation of said member will be transmitted to said actuated shaft about its geometric axis, and a pushing element connected with the driving shaft and moving along the periphery of the said annular member whereby the successive contact points of the rolling periphery of said member will be caused to bear upon the said flat base element, means being provided to vary the angle of the axis of the annular member with respect to the flat base element.

5. In combination with a change-speed device of the type defined in claim 1, washers of various thickness to be interposed between the flat base element in such manner that the angle of the axis of the annular member with respect to the flat base element may be varied.

In testimony whereof I have signed my name to this specification.

MARCEL GRIFFOUL.